United States Patent [19]
Comer et al.

[11] Patent Number: 5,486,846
[45] Date of Patent: Jan. 23, 1996

[54] INTELLIGENT KEYPAD OVERLAY FOR PORTABLE PERSONAL COMPUTERS

[75] Inventors: Keith Comer, Mission Viejo; Gary Elsasser, Cerritos, both of Calif.; Takano Iwakiri, Tokyo, Japan

[73] Assignee: Toshiba America Information Systems, Inc., Irvine, Calif.

[21] Appl. No.: 287,426

[22] Filed: Aug. 9, 1994

Related U.S. Application Data

[63] Continuation of Ser. No. 970,413, Nov. 2, 1992, abandoned.
[51] Int. Cl.⁶ .................................................. G09G 5/00
[52] U.S. Cl. ............................................. 345/168; 345/172
[58] Field of Search ................................... 345/168, 172, 345/169, 160, 157, 156, 145, 146; 364/706, 708.1; 341/22, 23, 20

[56] References Cited

U.S. PATENT DOCUMENTS

| | | | |
|---|---|---|---|
| 4,005,388 | 1/1977 | Morley et al. | 340/711 |
| 4,245,308 | 1/1981 | Hirschman et al. | 340/711 |
| 4,575,591 | 3/1986 | Lugaresi | 340/709 |
| 5,041,819 | 8/1991 | Takeda | 345/160 |
| 5,088,070 | 2/1992 | Shiff | 340/711 |
| 5,109,228 | 4/1992 | Banasjak | 340/711 |

*Primary Examiner*—Richard Hjerpe
*Assistant Examiner*—Xiao M. Wu
*Attorney, Agent, or Firm*—Banner & Allegretti, Ltd.

[57] ABSTRACT

A method and apparatus for an improved user interface for indicating a current keyboard operating mode for a computer having a small keyboard with multi-function keys. An iconic indicator is displayed for indicating a current mode of operation of the keyboard which allows a user to easily determine an expected response from keys actuated in a particular keyboard mode.

15 Claims, 7 Drawing Sheets

| | NUM LOCK FLAG | OVER-LAY FLAG | OVER-LAY ON? | ICON DISPLAYED | CODES GENERATED | "K" KEY EXAMPLE |
|---|---|---|---|---|---|---|
| STATE AT INITIAL BOOT-UP | 1 | 0 | NO | NONE | LETTERS | k |
| SHIFT HELD DOWN | 0 | 0 | NO | NONE | CAP LETTERS | K |
| ARROW MODE KEY PRESSED | 0 | 1 | YES | 4 ARROWS | ARROWS | DOWN ARROW |
| SHIFT HELD DOWN | 1 | 1 | YES | NUMBER PAD | NUMBERS | 2 |
| ARROW MODE KEY RE-PRESSED | 1 | 0 | NO | NONE | LETTERS | k |
| NUMBER MODE KEY PRESSED | 1 | 1 | YES | NUMBER PAD | NUMBERS | 2 |
| SHIFT HELD DOWN | 0 | 1 | YES | 4 ARROWS | ARROWS | DOWN ARROW |
| NUMBER MODE KEY RE-PRESSED | 1 | 0 | NO | NONE | LETTERS | k |

INTELLIGENT KEYPAD OVERLAY FOR PORTABLE PERSONAL COMPUTERS

This application is a continuation of application Ser. No. 07/970,413, filed Nov. 2, 1992 now abandoned.

BACKGROUND OF THE INVENTION

The present invention relates to an improved user interface for indicating current operating modes of a computer. More particularly, the present invention relates to a method and apparatus for an improved user interface for indicating a current keyboard operating mode of a computer where the keyboard has a plurality of multi-function keys.

Small computers, such as the so-called notebook computers, are physically too small to include keyboards with a full set of distinct keys covering alphabetic, numeric and cursor control functions like an industry-standard 101-key enhanced keyboard. Consequently, to provide the same functions as the 101-key keyboard, small keyboards are arranged by assigning selected keys to have multiple functions, or definitions. To enable the different functions of the selected keys, different keyboard modes must be invoked for reconfiguring the definition of the multi-function keys.

The industry standard 101-key keyboard has separate keys assigned for cursor control functions, i.e., up, down, left and right, Home, End, PageUp and PageDown, in addition to a 10-key numeric keypad. These functions are provided in small keyboards by keys performing multiple functions. That is, these functions are folded, or overlaid, onto other keys which are available on the small keyboard. For example, the alphabetic keys j, k, 1, u, i, o, 7, 8 and 9 are typically used to define 1, 2, 3, 4, 5, 6, 7, 8 and 9, respectively, for an embedded keypad. Special function keys are used to enable and disable the various keyboard operational modes for redefining the keys.

The industry standard 101-key keyboard also includes a numeric keypad which can be toggled between an "arrow mode" and a "number mode" by actuating a key labeled "NumLock". When the Numlock key is actuated, the state of a flag bit internal to the computer, called the Numlock flag, changes to indicate the current keyboard mode configuration. For example, if the NumLock flag is set, the keypad keys are defined as numbers. Conversely, if the NumLock flag is cleared, the keypad keys are defined as cursor control keys. The NumLock flag can also be changed by a dedicated application program to configure the numeric keypad in either a number mode or a cursor control mode.

An Overlay flag is used for configuring keyboard overlays in computers having small keyboards. In some small keyboard machines, the Overlay flag is separate from the NumLock key. In others, the Overlay flag is set whenever the NumLock flag is set. Unfortunately, this can be confusing to a user because some keys may have as many as three different functions, depending on the keyboard mode.

Currently available notebook-type computers indicate keyboard modes using LED indicators, labelled "Overlay" and "NumLock". The Overlay LED indicates whether the keyboard overlay, i.e., the embedded keypad, is enabled. The NumLock LED indicates whether the embedded keypad is in an "Arrow" or "Number" mode. These keyboard mode indicators display the mode, i.e., the status of internal hardware flags, and are controlled by actuation of special keys labelled "Overlay" and "NumLock," respectively.

The present invention indicates the mode of the keyboard by indicating what to expect when a multi-function key is actuated, not by merely indicating the state of the internal. Overlay and NumLock flags. This approach provides functional compatibility with existing keyboards while clearly indicating the keyboard mode to a user.

Instead of a user predicting the results of a keystroke based on lights indicating the state of obscure internal hardware flags, the present invention provides a clear iconic indication of the keyboard current mode. That is, if a four-arrows icon is displayed, the keyboard is in an arrows mode and the keypad will generate cursor control commands. If a numeric-keypad icon is displayed, the keyboard is in a number mode and the keypad will generate numbers. If neither icon is displayed, the keyboard in normal alpha mode and generates alphabetic letters. The arrow mode is activated by actuating a special key labeled with a four-arrows icon. The number mode is activated by actuating a key with a numeric-keypad label.

SUMMARY OF THE INVENTION

According to the present invention, an apparatus for indicating an operational mode of a keyboard for a computer includes a keyboard having a plurality of keys, at least two special keys and a plurality of modes of operation, a mode configuration circuit responsive to actuation of the special keys for configuring the keyboard in one of the plurality of modes of operation, and a display device responsive to the mode configuration circuit for displaying an iconic indicator corresponding to a mode of operation configured by the configuration circuit. The keyboard includes a plurality of keys each defining a different function for each respective mode of operation and the plurality of modes of operation includes an embedded keypad overlay mode of operation.

The configuration circuit is responsive to actuation of a first special key for configuring the keyboard in a first embedded keypad overlay mode of operation. The configuration means is also responsive to actuation of a second special key for configuring the keyboard in a second embedded keypad overlay mode of operation. When either the first or second special key is actuated a second time, the configuration circuit reconfigures the keyboard to a normal mode of operation.

When the keyboard is in the first embedded keypad overlay mode of operation, the multi-function keys are configured to generate cursor control commands. When the keyboard is in the second embedded keypad overlay mode of operation, the multi-function keys are configured to generate numbers.

According to the present invention, when the keyboard is in a normal mode of operation, the configuration circuit is responsive to actuation of a special function key for temporarily configuring the keyboard in an embedded keypad overlay mode of operation while the special function key is actuated. When the keyboard is in the embedded keypad overlay mode of operation, the configuration circuit is responsive to actuation of the special key for temporarily configuring the keyboard in the normal mode when the special function key is actuated. Whenever an embedded keypad overlay mode is configured, an iconic indicator corresponding to the current mode of operation is displayed.

The present invention also relates to a method for indicating a mode of operation of a keyboard for a computer where the keyboard has at least one embedded keypad overlay mode. The keyboard is configured in a first embedded keypad overlay mode of operation in response to actuation of a first special key and an iconic indicator corresponding to the first embedded keypad overlay mode of operation is displayed. If a second special key corresponding to a second embedded keypad overlay mode of operation is actuated when the keyboard is in the first embedded keypad overlay mode of operation, the keyboard is configured in the second embedded keypad overlay mode of operation and an iconic indicator corresponding to the second embedded keypad overlay mode of operation is displayed. If the second special key is again actuated, the keyboard is reconfigured to a normal mode of operation.

When the keyboard is configured in the second embedded keypad overlay mode of operation and a third special key is actuated, the keyboard is temporarily reconfigured in the first embedded keypad overlay mode of operation and an iconic indicator for the first embedded keypad overlay is displayed while the third special key is actuated. When the third special key is released, the keyboard is reconfigured in the second embedded keypad overlay mode of operation and an iconic indicator for the second embedded keypad overlay mode of operation is displayed.

When the keyboard is in a normal mode of operation and a special function key is actuated, the keyboard is temporarily configured in a first embedded keypad overlay mode of operation and an iconic indicator for the first embedded keypad overlay is displayed. When the special function key is released, the keyboard is reconfigured in the normal mode of operation.

DETAILED DESCRIPTION OF THE PREFERRED EMBODIMENTS

Figure 1:
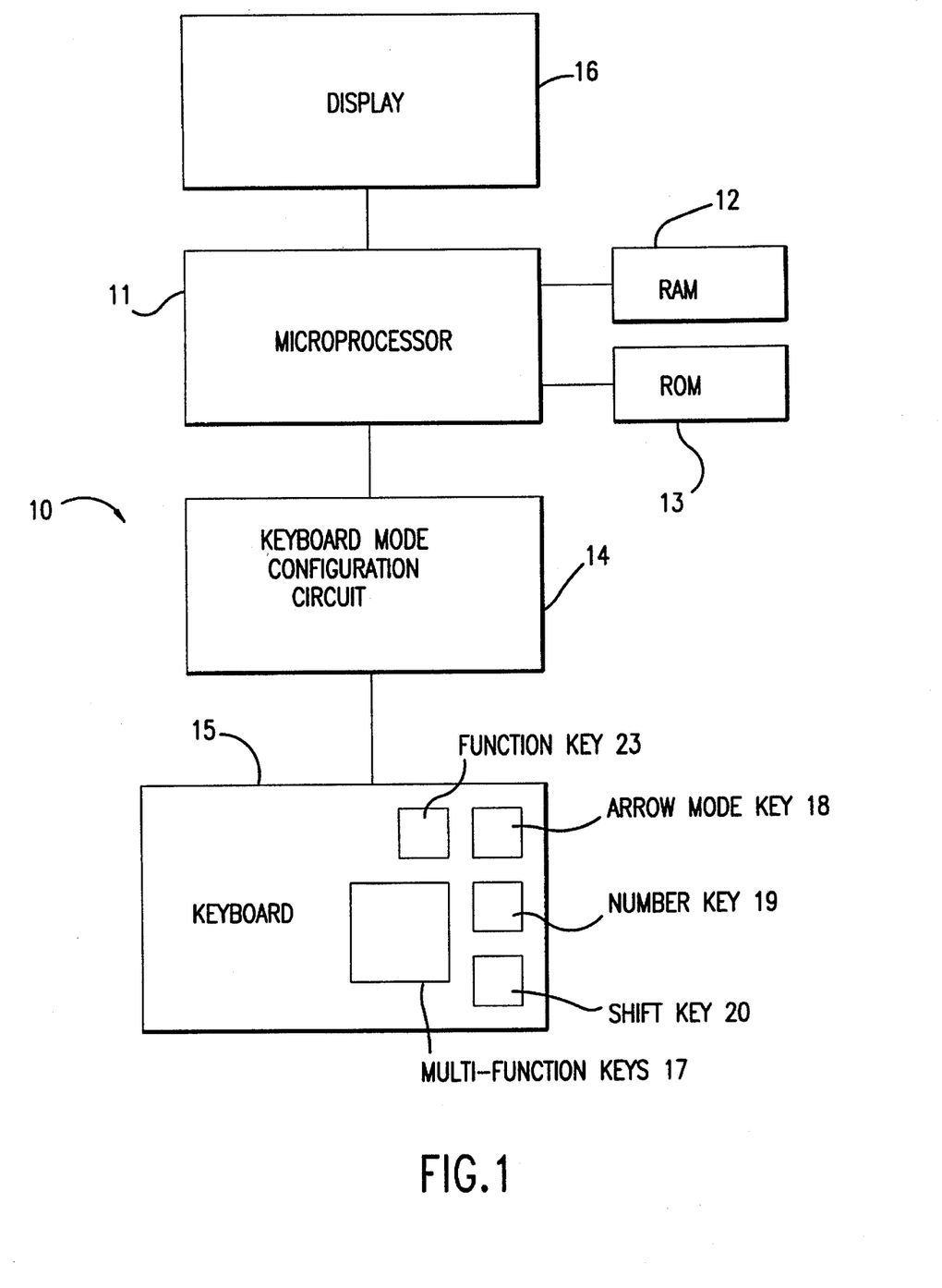
FIG. 1 is a block schematic diagram showing the preferred embodiment of the present invention.

FIG. 1 is a block schematic diagram of a small computer 10 including a microprocessor 11, a random access memory (RAM) 12, a only memory (ROM) 13, a keyboard mode configuration circuit 14, a small keyboard 15 and a display 16. RAM 12 and ROM 13 can be incorporated into microprocessor 11 or be separate components, as shown in FIG. 1. Similarly, keyboard mode configuration circuit 14 can be incorporated into microprocessor 11 or be a separate component such as another microprocessor, firmware or dedicated logic. Microprocessor 11 receives data input via keyboard 15 and responds to the data by controlling display 16 in accordance with a program stored either in RAM 12 or ROM 13 and executed by microprocessor 11. Display 16 can be a liquid crystal display (LCD), an iconic indicator using light emitting diodes (LEDs) or other similar indicating device.

Normally, keyboard 15 produces alphabetic characters according to marking on each respective key. However, to provide all of the functions of an industry-standard 101-key keyboard, several keys of keyboard 15 are provided as multi-function keys 17. That is, depending on the operational mode of keyboard 15, multi-functions keys 17 are reconfigured for different definitions. The different operational modes for keyboard 15 of this particular embodiment are a normal alpha mode for generating alphabetic characters according to marking on each respective key, an arrow mode for generating cursor control commands from an embedded keypad and a number mode for generating numbers from the embedded keypad.

Figure 2:
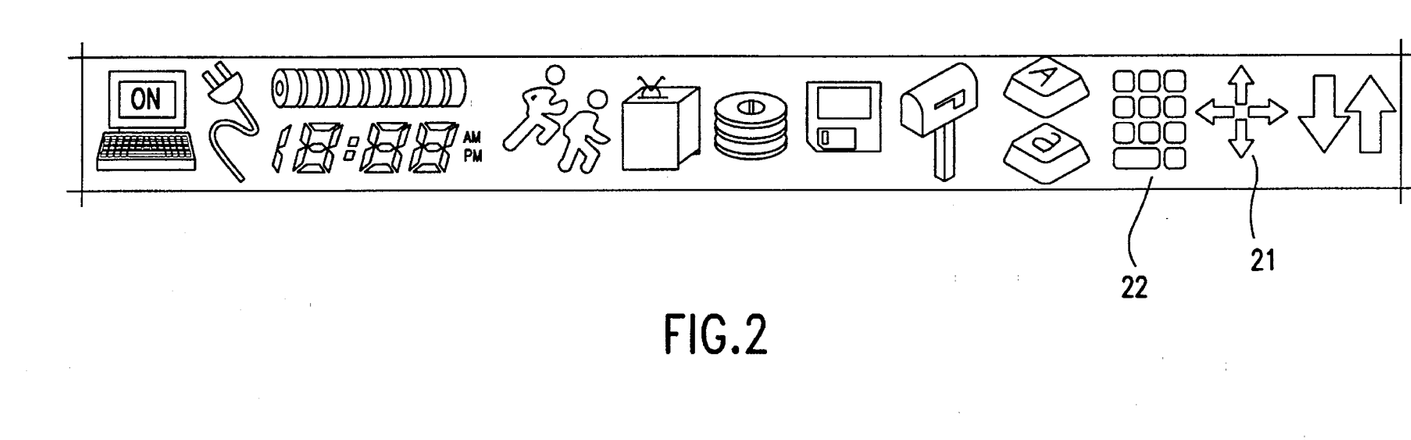
FIG. 2 illustrates iconic indicators for an arrow mode and a number mode according to the preferred embodiment of the present invention.

To change the operational mode of keyboard 15 from any current mode to the arrow mode, special key 18, labeled with a four-way arrow icon, is actuated. Keyboard mode configuration circuit 14 responds by setting an Overlay flag and reconfiguring alphabetic keys j, k, l, u, i, o, 7, 8 and 9 as an embedded keypad overlay for generating cursor controls commands. Keyboard mode configuration circuit 14 also clears an internal NumLock flag so that the embedded keypad of the overlay generates cursor control commands. Simultaneously, keyboard mode configuration circuit 14 causes microprocessor 11 to produce an arrow mode icon 21 on display 16, as shown in FIG. 2, to indicate that the current keyboard mode is the arrow mode. That is, all keys within the embedded keypad produce cursor control commands when actuated.

To change the keyboard to the number mode, special key 19, labeled with an iconic representation of a numeric keypad, is actuated. Keyboard mode configuration circuit 14 responds by setting the overlay flag and setting the internal NumLock flag. Simultaneously, keyboard mode configuration circuit 14 causes microprocessor 11 to produce a number mode icon 22, as shown in FIG. 2, to indicate that the number mode is the current keyboard mode. Thus, all keys within the embedded keypad overlay produce numbers when actuated.

To return the keyboard to the normal alpha mode, the special key corresponding to the mode displayed on display 16 as the current mode is actuated. In other words, if the number mode icon is displayed indicating that the keyboard is in the number mode, special number mode key 19 is actuated to return to the normal alpha mode. Keyboard mode configuration circuit 14 responds by disabling embedded keypad overlay and reconfiguring those keys to their respective alphabetic definitions. The state of the NumLock flag is not altered and the number mode icon is cleared from display 16 when the keyboard is reconfigured in the normal alpha mode. Determining which special key to actuate for returning to the normal alpha mode is simplified because the current keyboard mode is indicated on display 16 with easily recognizable icons.

If the keyboard is in an overlay-enabled state, i.e., either the arrow mode or the number mode, and the special key for the other embedded keyboard mode is actuated, keyboard mode configuration circuit 14 causes the state of the NumLock flag to toggle while keeping the embedded keypad overlay enabled. For example, if keyboard 15 is in the number mode, keyboard mode configuration circuit 14 responds to arrow mode special key 18 by reconfiguring the keyboard so that cursor control commands are generated by the embedded keypad. The NumLock flag is toggled from set to clear, and the four-way arrow icon is displayed on display 16. To return to the normal alpha mode, special key 18 is again actuated. Conversely, if keyboard 15 is in the arrow mode, keyboard mode configuration circuit 14 responds to number special key 19 by reconfiguring the keyboard so that numbers are generated by the embedded keypad. The NumLock flag is toggled from cleared to set and the number mode icon is displayed on display 16. Subsequent actuation of special key 19 restores the normal alpha mode.

A special key, labeled Fn (function key 23 of FIG. 1), temporarily enables the embedded keypad overlay when actuated. Keyboard mode configuration circuit 14 configures the keys of the embedded keypad in the number mode if the NumLock flag is set, and in the arrow mode is me NumLock flag is cleared. Additionally, the appropriate icon is displayed on display 16. When the Fn key is released, keyboard mode configuration circuit 14 reconfigures the keyboard in the normal alpha mode.

When the embedded keypad overlay is enabled and a Shift key is momentarily actuated, keyboard mode configuration circuit 14 temporarily reconfigures the embedded keypad definition to be the opposite configuration from that indicated by the NumLock flag. For example, when the NumLock flag is set and the embedded keypad is configured to generate numbers, if the Shift key is held down, the keypad will generate cursor control commands. The number icon displayed on display 16 will also change to the four-arrow icon at the same time. Similarly, when the NumLock flag is cleared and the embedded keypad is configured to generate cursor control commands, the keypad will be reconfigured to generate numbers and the number mode icon will be displayed when the Shift key is temporarily actuated.

Figure 3:
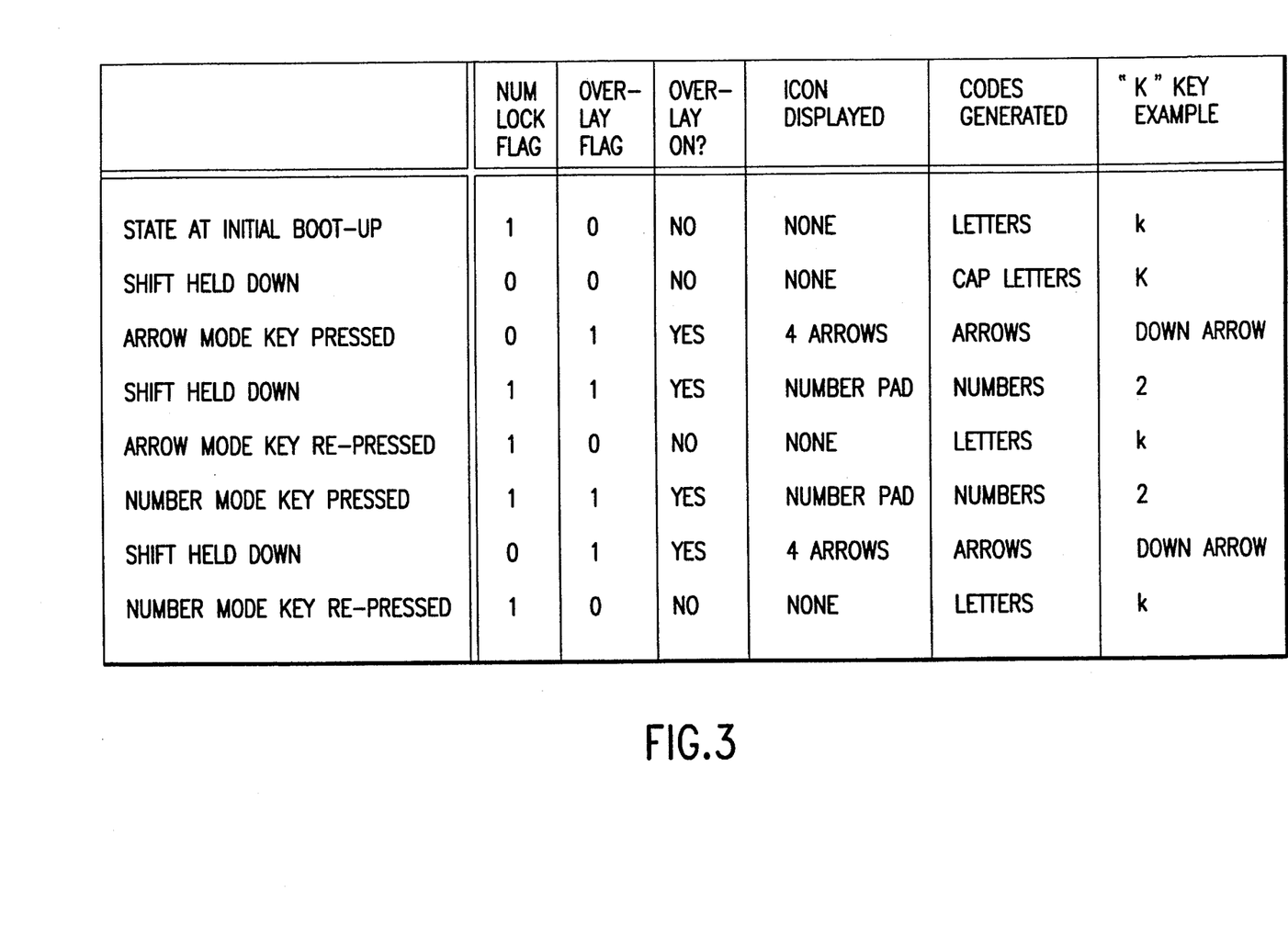
FIG. 3 is a summary of internal flags and keyboard operating modes according to the preferred embodiment of the present invention.

FIG. 3 summarizes the state of the NumLock, Overlay flags and operational modes of a computer system according to the present invention at initial boot-up, and after actuation of various special keys.

Figure 4:
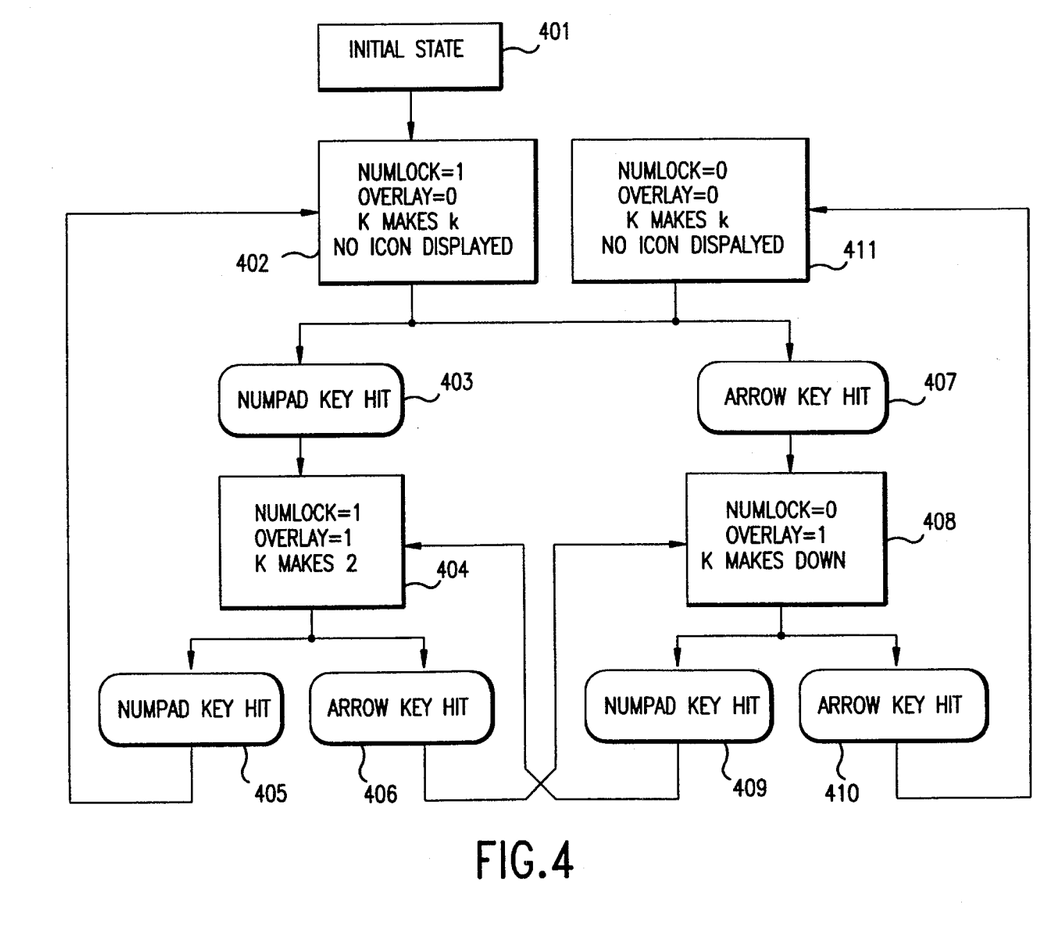
FIG. 4 illustrates a flow diagram for configuring the internal flags according to the present invention when the keyboard is initially in the normal alpha mode of operation.

FIG. 4 illustrates a flow diagram for configuring the internal flags according to the present invention when the keyboard is initially in the normal alpha mode of operation. At power-up 401, the keyboard is in the normal alpha operating mode with the NumLock and Overlay flags configured, as shown in 402, i.e., NumLock=1, Overlay=0. In the normal alpha mode, the "K" key, for example, is defined as a "k" and no icon is displayed. When special key 19 is actuated at 403, the internal flags are configured as shown in 404 with NumLock=1 and Overlay=1. The keyboard is then in a number mode of operation so that the "K" key is defined as "2" and the number mode icon is displayed. If special key 19 is actuated again at 405, the internal flags are configured as shown in 402 with NumLock=1 and Overlay=0. The keyboard is reconfigured to the normal alpha mode with the "K" key is again defined as "k" and no icon is displayed. If, at 404, special key 18 is actuated at 406, the internal flags are configured with NumLock=0 and Overlay=1, as shown at 408. The keyboard is then configured in the arrow mode so that the "K" key is defined to generate a downward cursor control command and the arrow mode icon is displayed.

If, at 402, special key 18 is actuated at 407, the internal flags are configured with NumLock=0 and Overlay=1, as shown at 408. The keyboard is configured in the arrow mode so that the "K" key is defined to generate a downward cursor control command and the arrow mode icon is displayed. If special key 19 is actuated at 409, the internal flags are configured with NumLock=1 and Overlay=1, as shown at 404. The keyboard is then configured in the number mode with the "K" key defined as a "2" and the number mode icon is displayed. If, at 408, special key 18 is actuated at 410, the internal flags are configured with NumLock=0 and Overlay=0 at 411, returning the keyboard to the normal alpha operating mode with the "K" defined as a "k".

Figure 5:
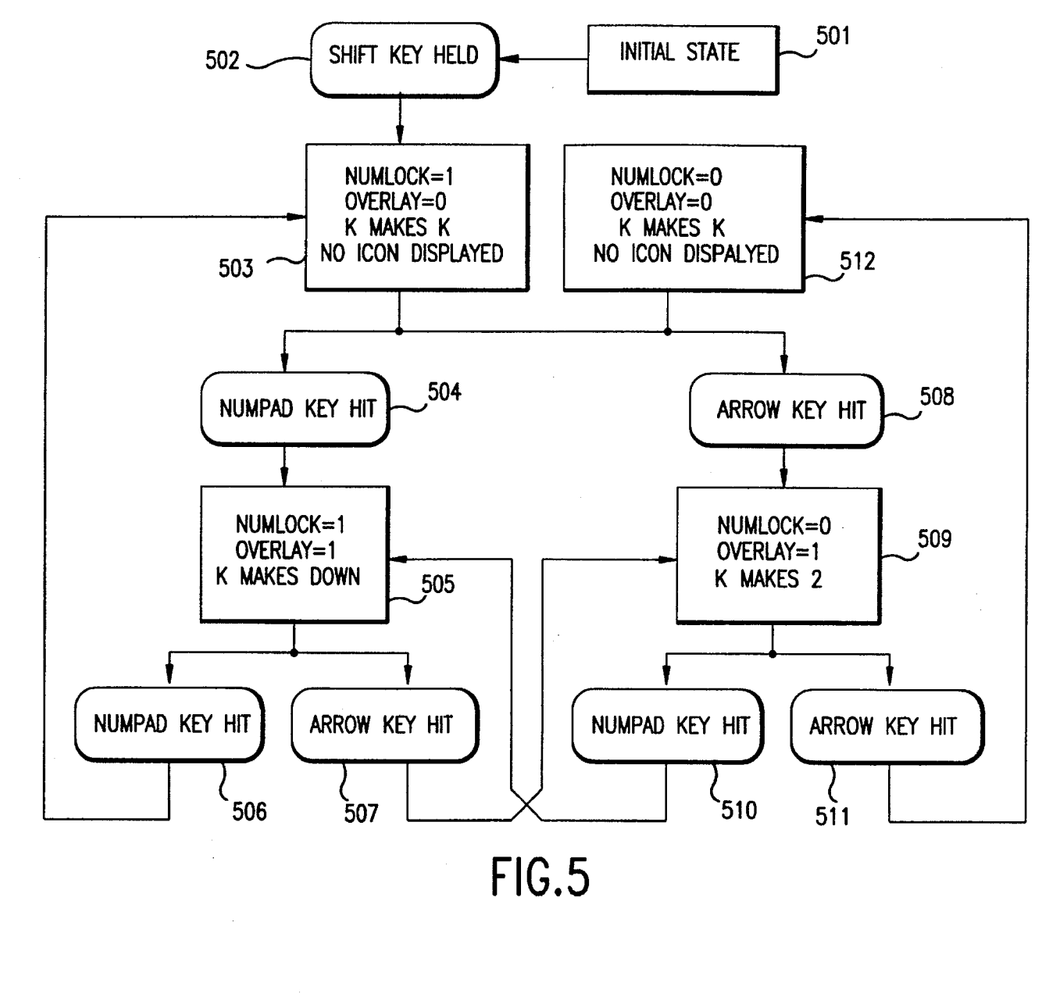
FIG. 5 illustrates a flow diagram for configuring the internal flags according to the present invention when the keyboard is initially in the normal alpha mode of operation and the Shift key is temporarily actuated.

FIG. 5 illustrates a flow diagram for configuring the internal flags according to the present invention when the keyboard is initially in the normal alpha mode of operation and the Shift key is temporarily actuated. At power-up 501, the keyboard is configured in the normal alpha operating mode with the NumLock and Overlay flags configured as shown in 402, i.e., NumLock=1, Overlay=0, as shown in FIG. 4. If the Shift key is temporarily actuated at 502, NumLock=1 and Overlay=0, as shown at 503. No icon is displayed and the "K" key is defined as "K". When special key 19 is actuated at 504, the internal flags are configured as shown in 505 with NumLock=1 and Overlay=1. However, the keyboard is in an arrow mode of operation because the Shift key is temporarily actuated so that the "K" key is defined as to generate a downward cursor control command and the arrow mode icon is displayed. If special key 19 is actuated again at 506, the internal flags are configured as shown in 503 with NumLock=1 and Overlay=0. The keyboard is reconfigured to the normal alpha mode with the "K" key is again defined as "K" and no icon is displayed. If, at 505, special key 18 is actuated at 507, the internal flags are configured with NumLock=0 and Overlay=1, as shown at 509. The keyboard is then configured in the number mode so that the "K" key is defined as a "2" and the number mode icon is displayed.

If, at 503, special key 18 is actuated at 508, the internal flags are configured with NumLock=0 and Overlay=1, as shown at 509. The keyboard is configured in the number mode because the Shift key is temporarily actuated, so that the "K" key is defined to generate a "2" and the number mode icon is displayed. If special key 19 is actuated at 510, the internal flags are configured with NumLock=1 and Overlay=1, as shown at 505. The keyboard is then configured in the arrow mode with the "K" key defined to generate a downward cursor control command and the arrow mode icon is displayed. If, at 509, special key 18 is actuated at 511, the internal flags are configured with NumLock=0 and Overlay=0 at 512, returning the keyboard to the normal alpha operating mode with the "K" defined as a "K" or a lower case "k" with the Shift key depressed.

Figure 6:
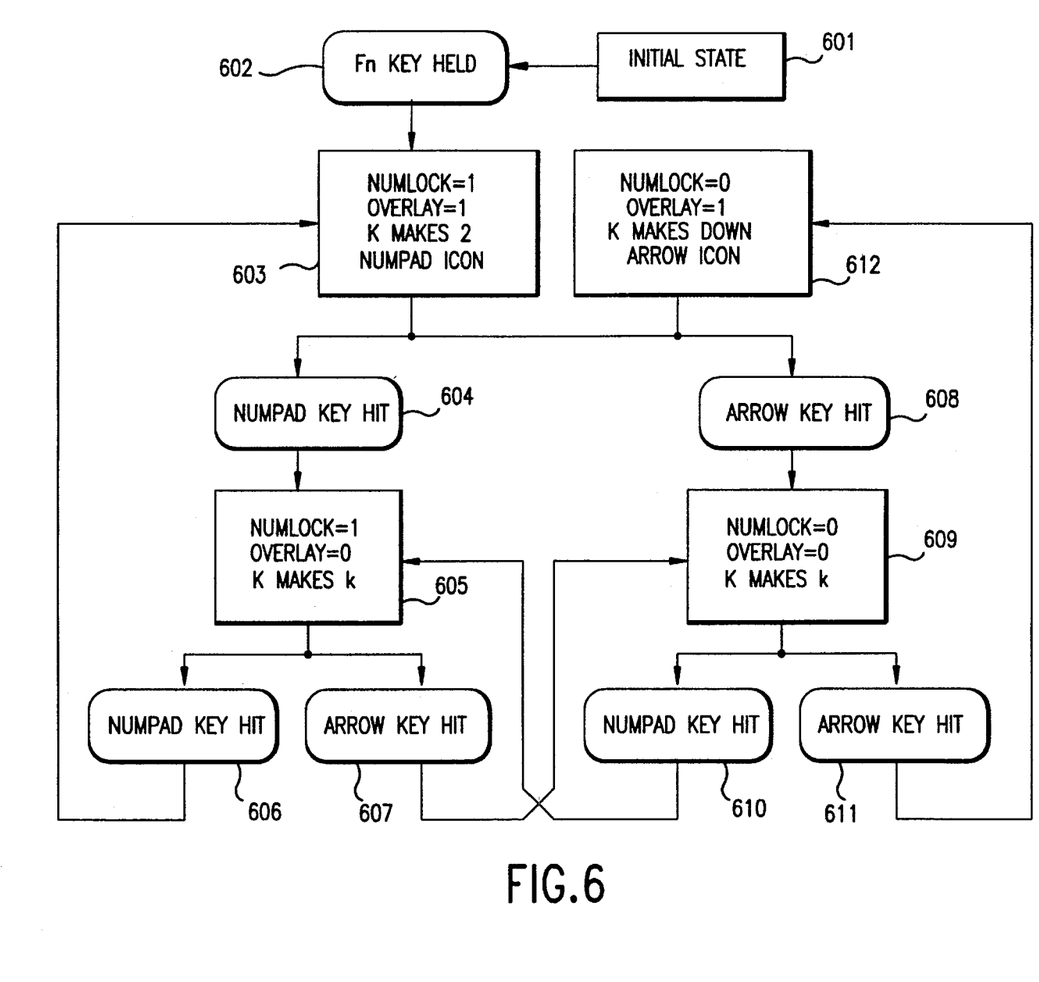
FIG. 6 illustrates a flow diagram for configuring the internal flags according to the present invention when the keyboard is initially in the normal alpha mode of operation and the Fn key is temporarily actuated.

FIG. 6 illustrates a flow diagram for configuring the internal flags according to the present invention when the keyboard is initially in the normal alpha mode of operation and the Fn key is temporarily actuated. At power-up 601, the keyboard is in the normal alpha operating mode with the NumLock and Overlay flags configured as shown in 402 of FIG. 4, i.e., NumLock=1, Overlay=0. When the Fn key is temporarily actuated at 602, the internal flags are configured as shown in 603 with NumLock=1 and Overlay=1. The number mode icon is displayed and the "K" is defined as a "2". When special key 19 is actuated at 604, the internal flags are configured as shown in 605 with NumLock=1 and Overlay=0. The keyboard is then in a normal alpha mode of operation so that the "K" key is defined as "k" and no icon is displayed. If special key 19 is actuated again at 606, the internal flags are configured as shown in 603 with NumLock=1 and Overlay=1. The keyboard is reconfigured to the number mode with the "K" key again defined as "2" and the number mode icon is displayed. If, at 5, special key 18 is actuated at 607, the internal flags are configured with NumLock=0 and Overlay=0, as shown at 609. The keyboard is then configured in the normal alpha mode so that the "K" key is defined as a "k" and no icon is displayed.

If, at 603, special key 18 is actuated at 608, the internal flags are configured with NumLock=0 and Overlay=0, as shown at 609. The keyboard is configured in the normal alpha mode so that the "K" key is defined as a "k" and no icon is displayed. If special key 19 is actuated at 610, the internal flags are configured with NumLock=1 and Overlay=0, as shown at 605. The keyboard is then configured in the normal alpha mode with the "K" key defined as a "k" and no icon is displayed. If, at 609, special key 18 is actuated at 611, the internal flags are configured with NumLock=0 and Overlay=1 at 612, configuring the keyboard to the arrow operating mode with the "K" defined to generate a downward cursor control command and the arrow mode icon is displayed.

Figure 7:
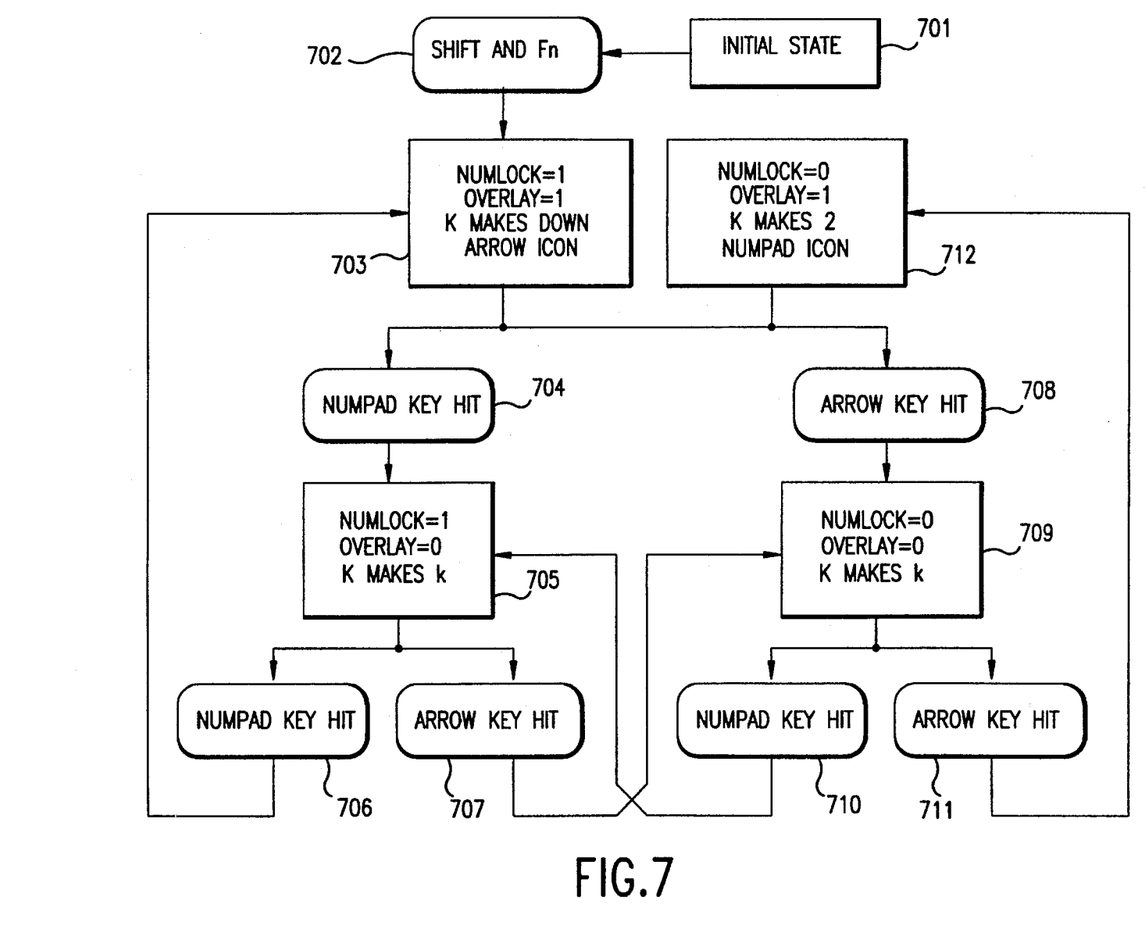
FIG. 7 illustrates a flow diagram for configuring the internal flags according to the present invention when the keyboard is initially in the normal alpha mode of operation and the Shift and Fn keys are temporarily actuated simultaneously.

FIG. 7 illustrates a flow diagram for configuring the internal flags according to the present invention when the keyboard is initially in the normal alpha mode of operation and the Shift and Fn keys are temporarily actuated simultaneously. At power-up 701, the keyboard is in the normal alpha operating mode with the NumLock and Overlay flags configured as shown in 402 of FIG. 4, i.e., NumLock=1, Overlay=0. When the Shift and Fn keys are simultaneously and temporarily actuated at 702, the internal flags are configured as shown in 703 with NumLock=1 and Overlay=1. The arrow mode icon is displayed and the "K" is defined to generate a downward cursor control command. When special key 19 is actuated at 704, the internal flags are configured as shown in 705 with NumLock=1 and Overlay=0. The keyboard is then in a normal alpha mode of operation so that the "K" key is defined as "k" and no icon is displayed. If special key 19 is actuated again at 706, the internal flags are configured as shown in 703 with NumLock=1 and Overlay=1. The keyboard is reconfigured to the arrow mode with the "K" key again defined to generate a downward cursor control command and the arrow mode icon is displayed. If, at 705, special key 18 is actuated at 707, the internal flags are configured with NumLock=0 and Overlay=0, as shown at 709. The keyboard is then configured in the normal alpha mode so that the "K" key is defined as a "k" and no icon is displayed.

If, at 703, special key 18 is actuated at 708, the internal flags are configured with NumLock=0 and Overlay=0, as shown at 709. The keyboard is configured in the normal alpha mode so that the "K" key is defined as a "k" and no icon is displayed. If special key 19 is actuated at 710, the internal flags are configured with NumLock=1 and Overlay=0, as shown at 705. The keyboard is then configured in the normal alpha mode with the "K" key defined as a "k" and no icon is displayed. If, at 709, special key 18 is actuated at 711, the internal flags are configured with NumLock=0 and Overlay=1 at 712, configuring the keyboard to the number operating mode with the "K" defined as a "2" and the number mode icon is displayed.

As should be apparent, the present invention can be readily implemented by other embodiments. Thus, while only the preferred embodiment of the present invention has been described in detail, it will be understood by those skilled in the art that various changes in form or in detail may be made without departing from the spirit and scope of the invention.

That which is claimed is:

1. An apparatus for setting and indicating a current operational mode of a keyboard having at least three modes of operation, the at least three modes of operation including a normal mode and a cursor mode and a number mode, the current operational mode being defined by an overlay flag and a numlock flag, the apparatus comprising:

at least two special actuation means, each for setting a mode of said keyboard, wherein one of said at least two special actuation means is a cursor mode actuator and wherein another of said at least two special actuation means is a number mode actuator; and mode configuration means, responsive to actuation of one of said cursor mode actuator and said number mode actuator, for setting the operational mode of the keyboard to be one of the at least three modes of operation, wherein said mode configuration means comprises cursor mode setting means for setting said overlay flag and for clearing said numlock flag when said cursor mode actuator is actuated, and wherein said mode configuration means further comprises number mode setting means for setting said overlay flag and for setting said numlock flag when said number mode actuator is actuated.

2. The apparatus of claim 1, further comprising display means, responsive to said mode configuration means, for displaying an iconic indicator corresponding to the current operational mode.

3. The apparatus of claim 1, wherein:

the current operational mode is the cursor mode when the overlay flag is set and the numlock flag is clear;

the current operational mode is the number mode when the overlay flag is set and the numlock flag is set; and the cursor mode setting means sets the current operational mode to the cursor mode when the cursor mode actuator is actuated while the current operational mode is the number mode.

4. The apparatus of claim 1, wherein:

the current operational mode is the cursor mode when the overlay flag is set and the numlock flag is clear;

the current operational mode is the number mode when the overlay flag is set and the numlock flag is set; and the number mode setting means sets the current operational mode to the number mode when the number mode actuator is actuated while the current operational mode is the cursor mode.

5. An apparatus for setting and indicating a current operational mode of a keyboard having at least three modes of operation, the at least three modes of operation including a normal mode and a cursor mode and a number mode, the current operational mode being defined by an overlay flag and a numlock flag, the apparatus comprising:

at least two special actuation means, each for setting a mode of said keyboard, wherein one of said at least two special actuation means is a cursor mode actuator and wherein another of said at least two special actuation means is a number mode actuator; and mode configuration means, responsive to actuation of one of said cursor mode actuator and said number mode actuator, for setting the current operational mode of the keyboard to be one of the at least three modes of operation, wherein said mode configuration means comprises cursor mode setting means for setting said overlay flag and for clearing said numlock flag when said cursor mode actuator is actuated, wherein said mode configuration means further comprises number mode setting means for setting said overlay flag and for setting said numlock flag when said number mode actuator is actuated, and wherein said mode configuration means is responsive to a second actuation of said one actuator to cancel the current operational mode set by the first actuation of said one actuator.

6. The apparatus of claim 5, further comprising display means, responsive to said mode configuration means, for displaying an iconic indicator corresponding to the current operational mode.

7. A method of setting and indicating an operational mode of a keyboard having at least three modes of operation, the method comprising steps of:

(1) setting, in response to actuation of a cursor mode actuator, an overlay flag;

(2) clearing, in response to said actuation of said cursor mode actuator, a numlock flag; and (3) setting, in response to actuation of a number mode actuator, said overlay flag and said numlock flag, said overlay and numlock flags defining which mode of the at least three modes is the operational mode.

8. An apparatus for setting and indicating an operational mode of a keyboard having normal, first and second modes of operation, the apparatus comprising:

a plurality of keys including first and second special keys and at least one multifunction key, a function of a first multifunction key depending on the operational mode; and configuring means for configuring the operational mode of the apparatus, the configuring means including an overlay flag capable of being one of set and clear and a numlock flag capable of being one of set and clear, the configuring means changing the operational mode from the normal mode to the first mode when the first special key is actuated, changing the operational mode from the normal mode to the second mode when the second special key is actuated, changing the operational mode from the second mode to the normal mode when the second special key is actuated again, changing the operational mode from the second mode to the first mode when the first special key is actuated, changing the operational mode from the first mode to the normal mode when the first special key is actuated again, and changing the operational mode from the first mode to the second mode when the second special key is actuated, wherein said configuring means comprises first mode setting means for setting said overlay flag and for clearing said numlock flag when said first special key is actuated, and wherein said configuring means further comprises second mode setting means for setting said overlay flag and for setting said numlock flag when said second special key is actuated.

9. The apparatus of claim 8, further including a display, the configuring means displaying a first icon on the display while the operational mode is the first mode and displaying a second icon on the display while the operational mode is the second mode.

10. The apparatus of claim 8, wherein:

the plurality of keys further includes a shift key;

when the operational mode is the first mode, the configuring means interprets the first multifunction key as if the operational mode was the second mode while the shift key is actuated; and when the operational mode is the second mode, the configuring means interprets the first multifunction key as if the operational mode was the first mode while the shift key is actuated.

11. The apparatus of claim 10, further including a display, the configuring means displaying a first icon on the display while the first multifunction key is interpreted as if the operational mode was the first mode, displaying a second icon on the display while the first multifunction key is interpreted as if the operational mode was the second mode, not displaying the first icon while the first multifunction key is interpreted as if the operational mode was the normal mode, and no displaying the second icon while the first multifunction key is interpreted as if the operational mode was the normal mode.

12. The apparatus of claim 8, wherein:

the plurality of keys further includes a function key;

when the operational mode is one of the first and second modes, the configuring means interprets the first multifunction key as if the operational mode was the normal mode while the function key is actuated; and when the operational mode is the normal mode, the configuring means interprets the first multifunction key as if the operational mode was one of the first and second modes while the function key is actuated.

13. The apparatus of claim 12, further including a display, the configuring means displaying a first icon on the display while the first multifunction key is interpreted as if the operational mode was the first mode, displaying a second icon on the display while the first multifunction key is interpreted as if the operational mode was the second mode, not displaying the first icon while the first multifunction key is interpreted as if the operational mode was the normal mode, and not displaying the second icon while the first multifunction key is interpreted as if the operational mode was the normal mode.

14. An apparatus for setting and indicating an operational mode of a key board having normal, first and second modes of operation, the apparatus comprising:

a plurality of keys including a shift key and a function key and first and second special keys and at least one multifunction key, a function of a first multifunction key depending on the operational mode; and configuring means for configuring the operational mode of the apparatus, the configuring means including a numlock flag capable of being one of set and clear, the configuration means changing the operational mode from the normal mode to the first mode when the first special key is actuated, changing the operational mode from the normal mode to the second mode when the second special key is actuated, changing the operational mode from the second mode to the normal mode when the second special key is actuated again, changing the operational mode from the second mode to the first mode when the first special key is actuated, changing the operational mode from the first mode to the normal mode when the first special key is actuated again, and changing the operational mode from the first mode to the second mode when the second special key is actuated, wherein:

when the operational mode is one of the first and second modes, the configuring means interprets the first multifunction key as if the operational mode was the normal mode while the function key is actuated, when the operational mode is the normal mode and the numlock flag is set, the configuring means interprets the first multifunction key as if the operational mode was the first mode while the function key is actuated and the shift key is not actuated, when the operational mode is the normal mode and the numlock flag is clear, the configuring means interprets the first multifunction key as if the operational mode was the second mode while the function key is actuated and the shift key is not actuated, when the operational mode is the normal mode and the numlock flag is set, the configuring means interprets the first multifunction key as if the operational mode was the second mode while the function key is actuated and the shift key is actuated, and when the operational mode is the normal mode and the numlock flag is clear, the configuring means interprets the first multifunction key as if the operational mode was the first mode when the function key is actuated and the shift key is actuated.

15. The apparatus of claim 14, further including a display, the configuring means displaying a first icon on the display while the first multifunction key is interpreted as if the operational mode was the first mode, displaying a second icon on the display while the first multifunction key is interpreted as if the operational mode was the second mode, not displaying the first icon while the first multifunction key is interpreted as if the operational mode was the normal mode, and not displaying the second icon while the first multifunction key is interpreted as if the operational mode was the normal mode.

* * * * *